(12) United States Patent
Bellows et al.

(10) Patent No.: US 8,242,909 B2
(45) Date of Patent: Aug. 14, 2012

(54) METHOD OF CONFIGURING RFID READER

(75) Inventors: David E. Bellows, Wantagh, NY (US);
Joseph R. White, Woodbine, MD (US);
Thomas E. Wulff, North Patchogue, NY (US)

(73) Assignee: Symbol Technologies, Inc., Holtsville, NY (US)

(*) Notice: Subject to any disclaimer, the term of this patent is extended or adjusted under 35 U.S.C. 154(b) by 713 days.

(21) Appl. No.: 12/185,867

(22) Filed: Aug. 5, 2008

(65) Prior Publication Data

US 2010/0033306 A1 Feb. 11, 2010

(51) Int. Cl.
*G08B 13/14* (2006.01)

(52) U.S. Cl. .............. 340/572.1; 340/572.7; 340/10.1; 340/10.3

(58) Field of Classification Search .............. 340/572.1, 340/572.7, 539.1, 568.1, 825.49, 10.1, 539.23, 340/825.69, 825.72, 10.3; 235/375, 380, 235/381, 383
See application file for complete search history.

(56) References Cited

U.S. PATENT DOCUMENTS

| | | | | |
|---|---|---|---|---|
| 7,170,412 B2* | 1/2007 | Knox et al. | .............. | 340/572.1 |
| 7,199,719 B2* | 4/2007 | Steinberg | .............. | 340/572.8 |
| 7,453,363 B2* | 11/2008 | Reynolds | .............. | 340/572.7 |
| 7,843,347 B2* | 11/2010 | Nikitin et al. | .............. | 340/572.7 |
| 2006/0267733 A1* | 11/2006 | Steinke et al. | .............. | 340/10.1 |

* cited by examiner

*Primary Examiner* — Hung T. Nguyen

(57) ABSTRACT

A method of configuring an RFID reader includes (1) collecting information related to an operation environment of an RFID reader, and (2) configuring the RFID reader to operate in a mode that is selected for the operation environment of the RFID reader.

4 Claims, 6 Drawing Sheets

US 8,242,909 B2

METHOD OF CONFIGURING RFID READER

FIELD OF THE DISCLOSURE

The present disclosure relates generally to RFID technology.

BACKGROUND

RFID technology generally involves interrogating an RFID tag with radio frequency (RF) waves and reading the responding RF waves with a RFID reader. A RFID tag typically includes a miniscule microchip coupled to an RF antenna. RFID tags can be attached to the object to be identified. An RFID reader typically includes an antenna coupled to a transmitter and a receiver.

In some implementations the antenna in the RFID reader can generate RF waves with different polarizations. For example, as shown in FIG. 1A-FIG. 1C, the RFID reader 40 can generate RF waves in x-polarization, y-polarization, or circular polarization, for interrogating an RFID tag 60. Many RFID tags mainly respond to the interrogating RF waves with one particular polarization. For example, as shown in FIG. 1A-FIG. 1C, when the RFID tag 60 mainly responds to the interrogating RF waves with x-polarization, it can be characterized that the RFID tag is linear polarized and has the orientation in the x-direction. In FIG. 1A, when the RFID reader 40 generates the interrogating RF waves with x-polarization, generally, some of these x-polarized RF waves can be efficiently coupled to the antenna of the RFID tag 60. In FIG. 1B, when the RFID reader 40 generates the interrogating RF waves with y-polarization, generally, it can be difficult for these y-polarized RF waves to be efficiently coupled to the antenna of the RFID tag 60. In FIG. 1C, when the RFID reader 40 generates the interrogating RF waves with circular polarization, only the x-component of the circular polarization can possibly be efficiently coupled to the antenna of the RFID tag 60.

Generally, depending upon how an RFID tag is attached to an object and how the object changes its orientation after the attachment, an operator of the RFID reader may not always know the orientation of the RFID tag. If the orientation of the RFID tag is in the x-direction, the operator of the RFID reader may want to generate the interrogating RF waves with x-polarization to maximize the RF power received by the RFID tag. If the orientation of the RFID tag is in the y-direction, the operator of the RFID reader may want to generate the interrogating RF waves with y-polarization. If the orientation of a linear polarized RFID tag is unknown, the operator of the RFID reader can generate the interrogating RF waves with circular polarization. With the circular polarization, however, at least half of the RF power of the interrogating RF waves is not coupled to the linear polarized RFID tag.

It is desirable to have an RFID reader that can adapt to its application and environment by configuring itself to operate in a mode that may improve its performance.

SUMMARY

In one aspect, the invention is directed to a method of configuring an RFID reader. The method includes collecting information related to an operation environment of an RFID reader, and configuring the RFID reader to operate in a mode that is selected for the operation environment of the RFID reader.

Implementations of the invention may include the following. The collecting information related to an operation environment can include determining a location of the RFID reader. The collecting information related to an operation environment can include determining an orientation of the RFID reader. The collecting information related to an operation environment can include determining a location and an orientation of the RFID reader. The collecting information related to an operation environment can include interrogating a collection of RFID tags to determine an orientation distribution of the collection of RFID tags.

Implementations of the invention can include one or more of the following advantages. The performance of an RFID reader may be improved when the RFID reader can configure itself to adapt to its operation environment. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
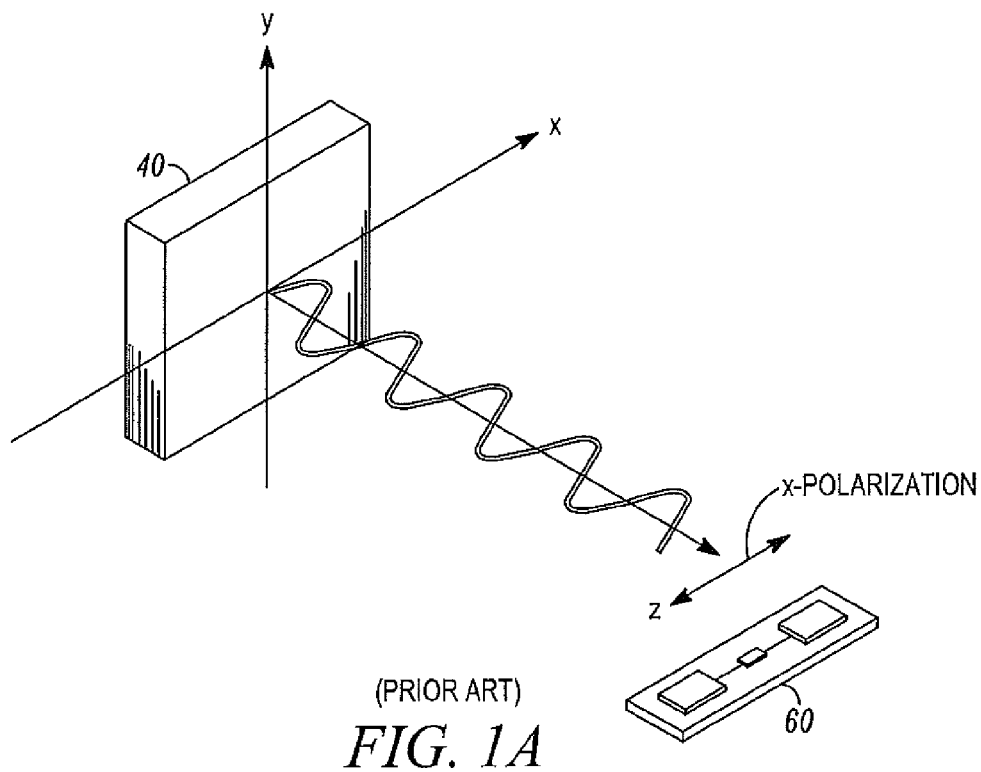
FIG. 1A-FIG. 1C illustrate that an RFID reader can generate RF waves in x-polarization, y-polarization, or circular polarization, for interrogating an RFID tag.
Figure 1B:
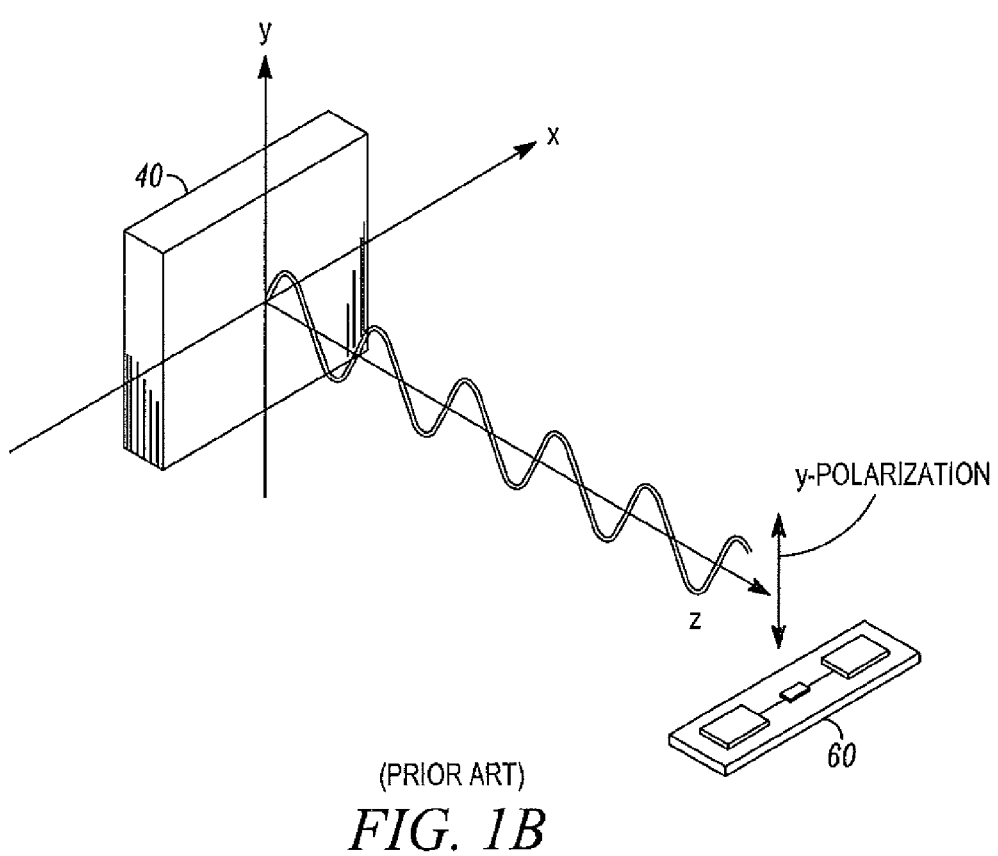
Figure 1C:
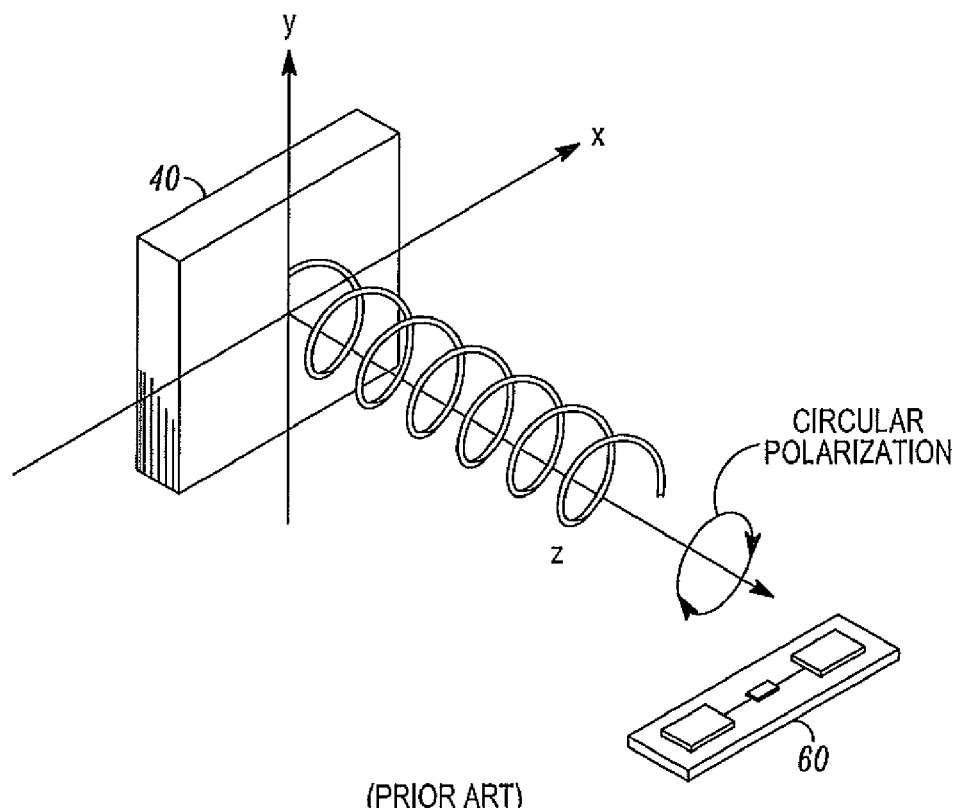

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
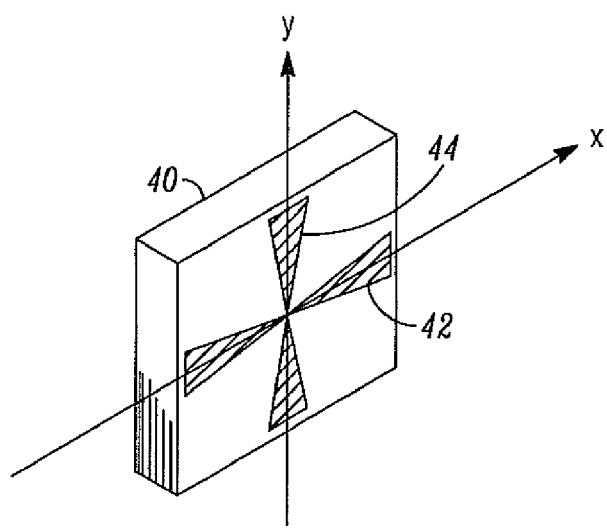
FIG. 2 is a schematic of an antenna for an RFID reader in accordance with some embodiments.

FIG. 2 is a schematic of the antenna for an RFID reader 40 in accordance with some embodiments. The RFID reader 40 includes a horizontal antenna structure 42 and a vertical antenna structure 44. When the RFID reader 40 operates in horizontal polarization mode, RF power is applied to the horizontal antenna structure 42, and RF waves with x-polarization are generated. When the RFID reader 40 operates in vertical polarization mode, RF power is applied to the vertical antenna structure 44, and RF waves with y-polarization can be generated. When the RFID reader 40 operates in circular polarization mode, equal amount of RF power is applied to the horizontal antenna structure 42 and the vertical antenna structure 44, and RF waves with circular polarization can be generated, provided that the voltage or current applied to the two antenna structures has a phase difference of 90 degrees. The RFID reader 40 can also operate in a cross-pole mode, in which, the RF power is alternatively applied to the horizontal antenna structure 42 and the vertical antenna structure 44. In the cross-pole mode, the RFID reader 40 generates RF waves with x-polarization during some time period, but generates RF waves with y-polarization during some other time period.

When the RFID reader 40 operates in circular polarization mode or cross-pole mode, RFID tags with any orientation in the x-y plane can be interrogated. The RFID reader 40 operating in the cross-pole mode typically has a longer interrogation range than operating in circular polarization mode, whereas the RFID reader 40 operating in the circular polarization mode typically has a faster read rate than operating in cross-pole mode.

Figure 3:
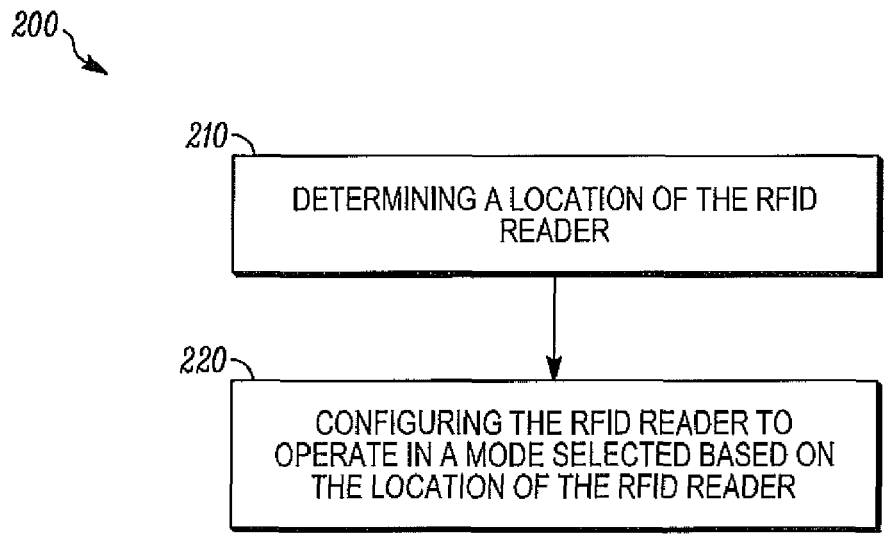
FIG. 3-FIG. 7 are flowcharts related to methods of configuring an RFID reader to operate in a mode adapted to its operation environment.

FIG. 3 is a flowchart that shows a method 200 of configuring an RFID reader to operate in a mode adapted to its operation environment, in accordance with some embodiments. The method 200 includes blocks 210 and 220. The block 210 includes determining a location of the RFID reader. The block 220 includes configuring the RFID reader to operate in a mode selected based on the location of the RFID reader.

As implementations of the block 210, the location of the RFID reader can be determined with several methods. The location of the RFID reader can be determined with a wireless network, such as WiFi or WiMax. The location of the RFID reader can be determined from a GPS system. The location of the RFID reader can be determined from a sample RFID tag or a sample barcode. The sample RFID tag or the sample barcode can be locally placed on shelves or racks for location identification purposes. The sample RFID tag or the sample barcode can be just one of the RFID tags or the barcodes attached to the object to be interrogated. The location of the RFID reader does not have to be a Cartesian coordinates of the RFID reader. In some implementations, the location of the RFID reader can simply be identified by a particular type of item or items. For example, the RFID reader may find its location to be where apparels in the store are located.

As implementations of the block 220, once the location of the RFID reader is determined, the RFID reader can be configured to operate in a mode that is somewhat optimized for that location. For example, when the RFID reader is used in a storage area at the back of a store where some objects may be stored behind others, the RFID reader may configure itself to operate in the cross-pole mode to increase its interrogation range. When the RFID reader is brought to the front of the store, the RFID reader may configure itself to operate in the circular polarization mode for applications that do not require long interrogation range, such as the application for apparel inventory. In another example, after the location of the RFID reader is determined, if the RFID reader knows that the RFID tags in this location are all oriented in the vertical direction, the RFID reader can configure itself to operate in a mode to generate interrogating RF waves with vertical polarization.

Figure 4:
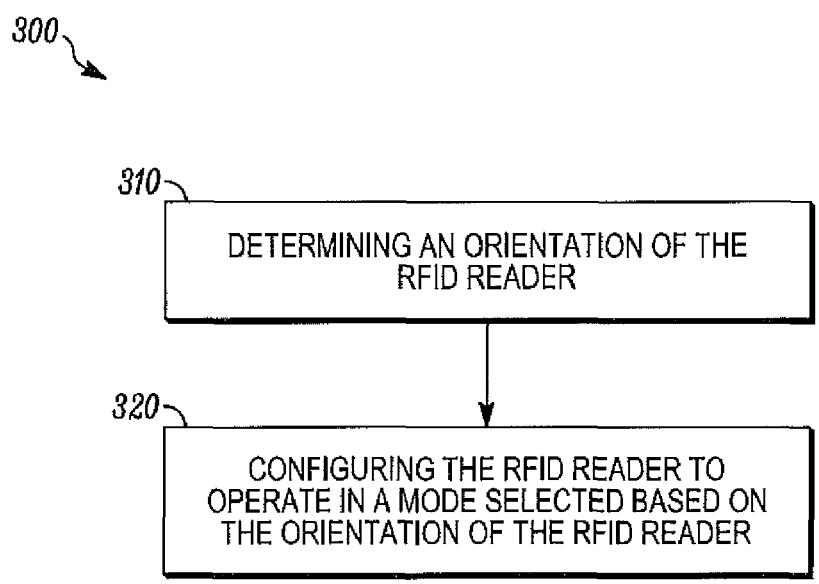

FIG. 4 is a flowchart that shows a method 300 of configuring an RFID reader to operate in a mode adapted to its operation environment, in accordance with some embodiments. The method 300 includes blocks 310 and 320. The block 310 includes determining an orientation of the RFID reader. The block 320 includes configuring the RFID reader to operate in a mode selected based on the orientation of the RFID reader. In one implementation, the orientation of the RFID reader can be determined with a low-g accelerometer installed on or in the RFID reader. If the RFID reader is rotated back and forth continuously, the RFID reader can automatically switch to the circular polarization mode or the cross-pole mode.

Figure 5:
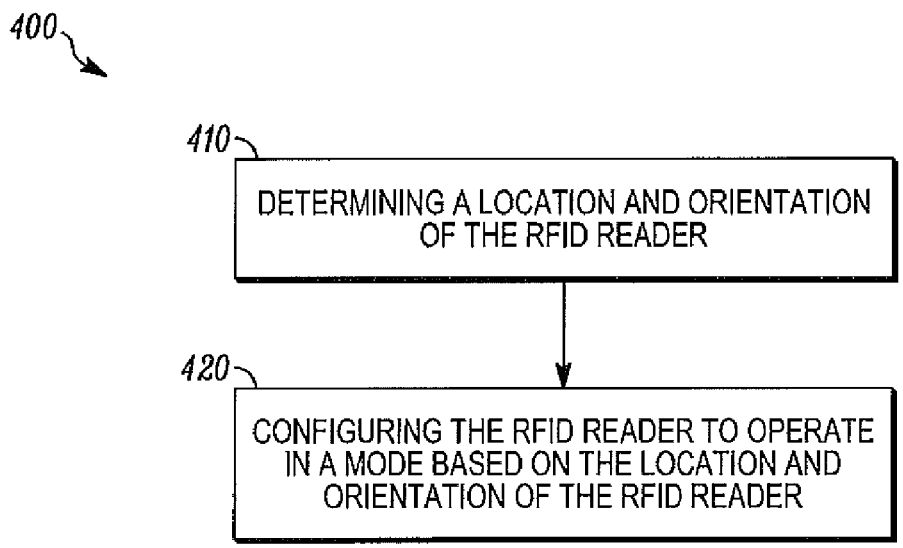

FIG. 5 is a flowchart that shows a method 400 of configuring an RFID reader to operate in a mode adapted to its operation environment, in accordance with some embodiments. The method 400 includes blocks 410 and 420. The block 410 includes determining a location and an orientation of the RFID reader. The block 420 includes configuring the RFID reader to operate in a mode based on the location and the orientation of the RFID reader. In one implementation, if the RFID reader knows that the RFID tags in this location are all orientated in the vertical direction and the RFID reader finds itself is rotated 90 degrees, then, the RFID reader can change its operation mode such that the polarization of the interrogating RF waves is rotated by 90 degrees accordingly.

Figure 6:
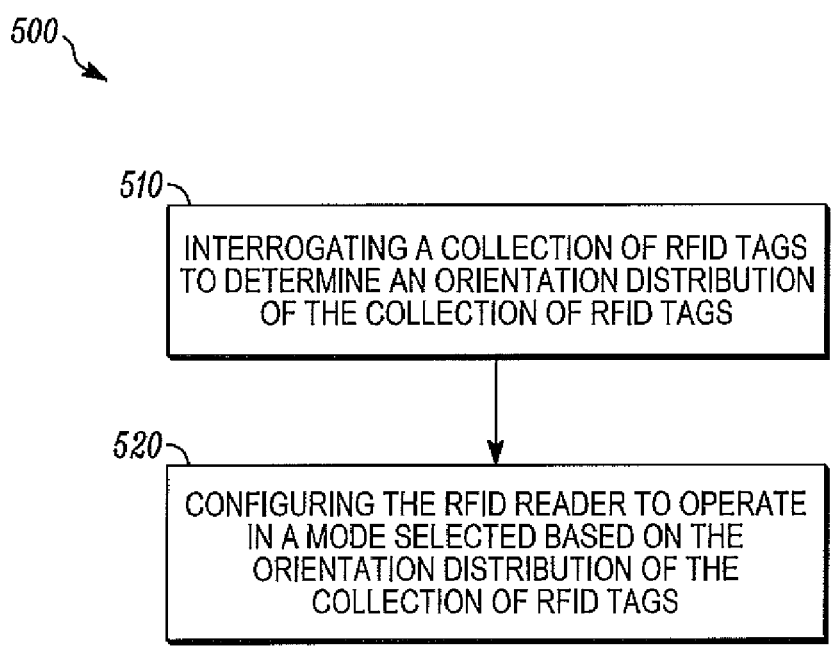

FIG. 6 is a flowchart that shows a method 500 of configuring an RFID reader to operate in a mode adapted to its operation environment, in accordance with some embodiments. The method 500 includes blocks 510 and 520. The block 510 includes interrogating a collection of RFID tags to determine an orientation distribution of the collection of RFID tags. The block 520 includes configuring the RFID reader to operate in a mode selected based on the orientation distribution of the collection of RFID tags.

In an example operation environment, the RFID reader is located in a location where some of the RFID tags are oriented in the horizontal direction and some of the RFID tags are oriented in the vertical direction. In one implementation, the RFID reader can start interrogating a collection of RFID tags with the RFID reader operating in a circular polarized mode. If the RFID reader detects that 75% of the RFID tags are oriented in the horizontal direction and 25% of the RFID tags are oriented in the vertical direction, the RFID reader can automatically switch to the cross-pole mode, running the horizontal antenna 75% of time and the vertical antenna the other 25% of the time. As the RFID reader continues to be used, the settings of operation mode of the RFID reader can be updated on the fly.

In another implementation, the RFID reader can start interrogating a collection of RFID tags with the RFID reader operating in the cross-pole mode, running the horizontal antenna 50% of time and the vertical antenna the other 50% of the time. The partition of the time between the running of the horizontal antenna and the running of the vertical antenna can be adjusted on the fly as well. Such adjustment in the partition of the time can be achieved based the information gathered by the RFID reader about the operation environment, such as, the statistical distribution of the RFID tags in either the horizontal direction or the vertical direction.

Figure 7:
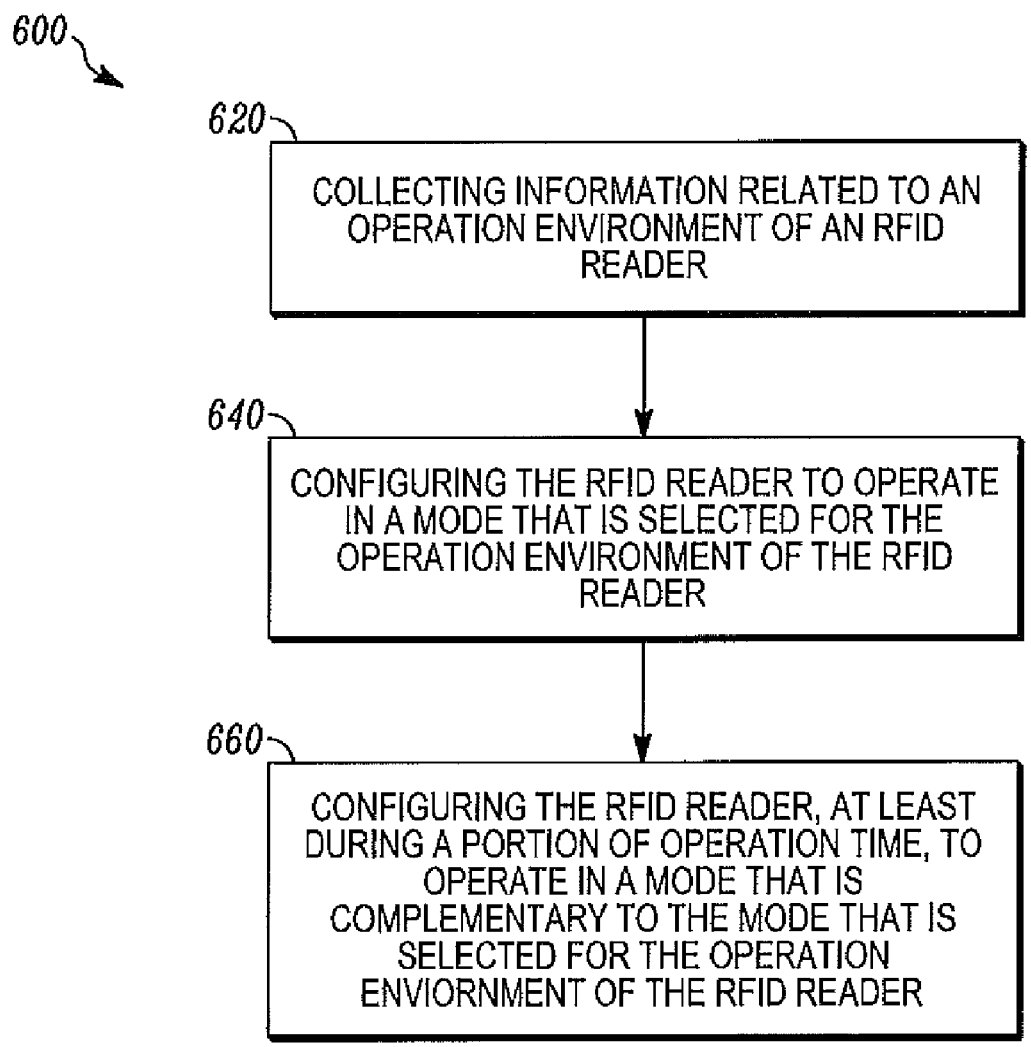

FIG. 7 is a flowchart that shows a method 600 of configuring an RFID reader to operate in a mode adapted to its operation environment, in accordance with some embodiments. The method 600 includes blocks 610, 620, and 630.

The block 610 includes collecting information related to an operation environment of an RFID reader. In one implementation, the collecting information related to an operation environment can include determining a location of the RFID reader. In another implementation, the collecting information related to an operation environment can include determining the orientation of the RFID reader. In another implementation, the collecting information related to an operation environment can include determining a location and an orientation of the RFID reader.

The block 620 includes configuring the RFID reader to operate in a mode that is selected for the operation environment of the RFID reader. In one implementation, the configuring the RFID reader comprises configuring the RFID reader to operate in a mode selected based on the location of the RFID reader. In another implementation, the configuring the RFID reader comprises configuring the RFID reader to operate in a mode selected based on the orientation of the RFID reader. In another implementation, the configuring the RFID reader comprises configuring the RFID reader to operate in a mode based on the location and the orientation of the RFID reader.

Figure 8A:
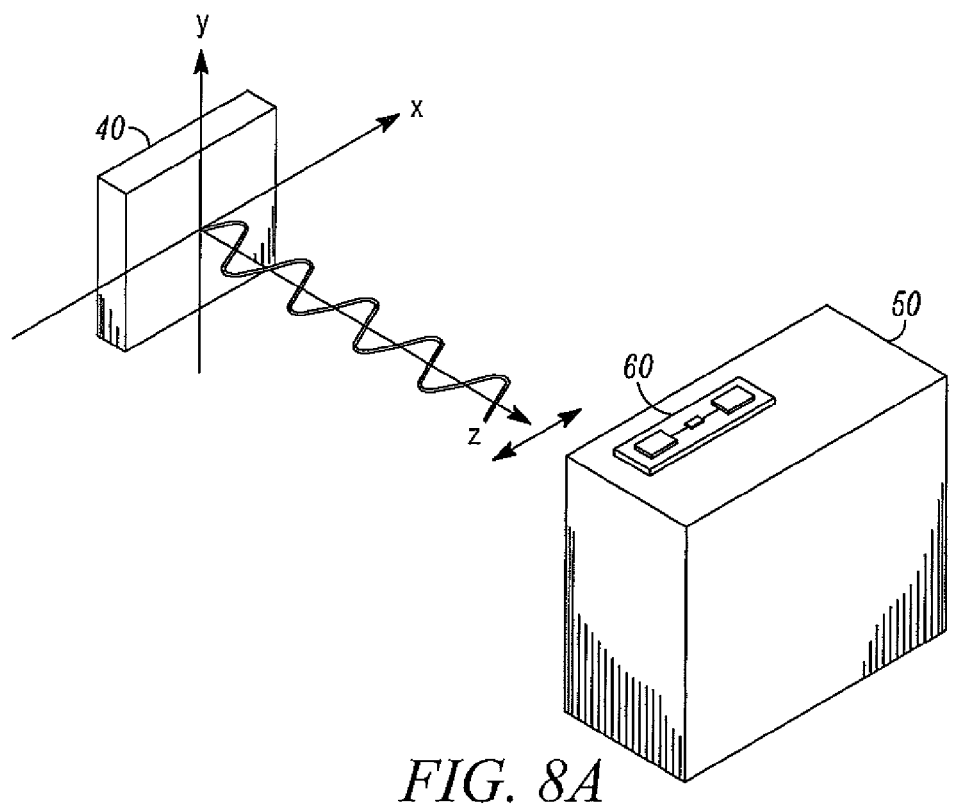
FIG. 8A shows that the RFID reader can configure itself to operate in a mode to generate interrogating RF waves with the horizontal polarization.
Figure 8B:
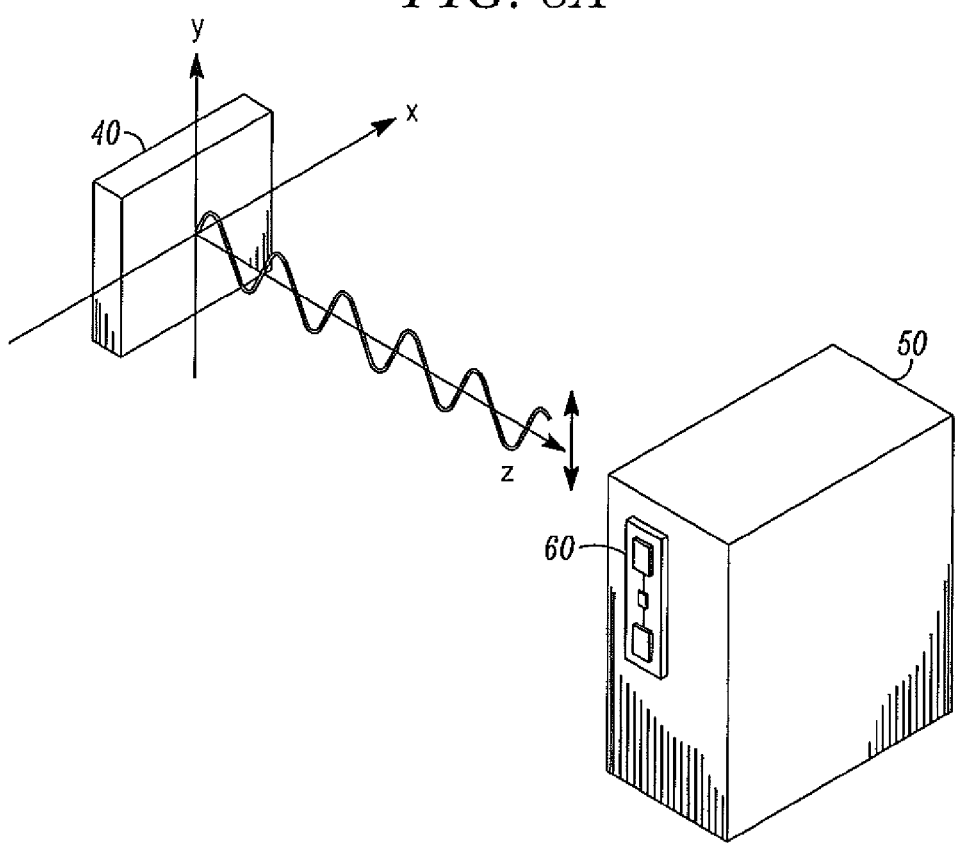
FIG. 8B shows that the RFID reader can also configure itself to operate in a mode to generate interrogating RF waves with the vertical polarization.

The block 630 includes configuring the RFID reader, at least during a portion of operation time, to operate in a mode that is complementary to the mode that is selected for the operation environment of the RFID reader. In an example operation environment, as shown in FIG. 8A-FIG. 8B, the RFID reader is located in a location where RFID tags are presumably oriented in the horizontal direction, but some of the RFID tags may possibly be misplaced as orienting in the vertical direction. As shown in FIG. 8A, based on the location information, the RFID reader can configure itself to operate in a mode to generate interrogating RF waves with the horizontal polarization. As shown in FIG. 8B, the RFID reader can also configure itself, at least during a portion of operation time, to operate in a mode to generate interrogating RF waves with the vertical polarization. In this way, by operating in a complementary mode, the RFID reader will be able to interrogate those RFID tags that have been misplaced with erroneous orientations. The RFID reader can switch itself to this vertical polarization mode at the end of a read session to ensure all tags were indeed read. The RFID reader can also switch itself to this vertical polarization mode regularly during a small percentage of the operation time.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   determining as processed/controlled by a processor an orientation of a Radio Frequency Identification (RFID) reader, and determining as processed/controlled by a processor orientations of a collection of RFID tags by determining a percentage of tags oriented in a horizontal direction able to be read by a horizontal polarization of the RFID reader antenna system and the percentage of tags oriented in a vertical direction able to be read by a vertical polarization of the RFID reader antenna system; and configuring the RFID reader in its orientation as processed/controlled by a processor to operate in a horizontal polarization mode during a first portion of operation time based on the percentage of tags oriented in the horizontal direction, and to operate in a vertical polarization mode during a second portion of operation time based on the percentage of tags oriented in the vertical direction.

2. The method of claim 1, wherein:

determining includes interrogating a collection of RFID tags using a circularly polarized mode to determine the orientations of the collection of RFID tags by determining a proportion of tags oriented in a horizontal direction able to be read during a horizontal polarization of the RFID reader and the proportion of tags oriented in a vertical direction able to be read during a vertical polarization of the RFID reader.

3. The method of claim 1, wherein:

determining includes interrogating a collection of RFID tags using a cross polarized mode to determine an orientation distribution of the collection of RFID tags by determining a proportion of tags oriented in a horizontal direction able to be read during a horizontal polarization of the RFID reader and the proportion of tags oriented in a vertical direction able to be read during a vertical polarization of the RFID reader.

4. The method of claim 1, wherein:

determining also includes determining a location of the RFID reader; and configuring the RFID reader also includes configuring the RFID reader to operate in a mode based on both the location and the orientation of the RFID reader.

* * * * *